United States Patent

[11] 3,548,903

| [72] | Inventor | James A. Holly<br>Olympia Fields, Ill. |
|---|---|---|
| [21] | Appl. No. | 742,329 |
| [22] | Filed | July 3, 1968 |
| [45] | Patented | Dec. 22, 1970 |
| [73] | Assignee | Hollymatic Corporation<br>a corporation of Illinois<br>Continuation-in-part of application Ser. No.<br>689,066, Dec. 8, 1967, now Patent No.<br>3,506,019. |

[54] SUBDIVIDED MEAT MIXER AND METHOD
10 Claims, 3 Drawing Figs.

[52] U.S. Cl. .................................................... 146/182,
259/45
[51] Int. Cl. ....................................................... B02c 18/00,
B01f 7/04
[50] Field of Search .......................................... 146/186,
182, 181; 259/45, 46, 68, 69, 9, 10

[56] References Cited
UNITED STATES PATENTS

| 3,251,579 | 5/1966 | Lasar | 259/46 |
| 3,450,180 | 6/1969 | Braun | 146/182 |

*Primary Examiner*—Willie G. Abercrombie
*Attorney*—Hofgren, Wegner, Allen, Stellman and McCord ABSTRACT: An apparatus and method for mixing subdivided meat that includes a mixing chamber and rotatable blade means laterally and angularly spaced about a rotatable shaft with the blades being angled so as to fold the meat over and over, preferably at a plurality of spaced levels, and to urge the meat alternately back and forth, all during rotation of the shaft means. The chamber includes an exit opening with means for moving the meat while mixing is going on through the opening preferably into a selectively driven grinder communicating therewith.

PATENTED DEC 22 1970

INVENTOR.
JAMES A. HOLLY

BY Hofgren, Wegner, Allen, Stellman & McCord

ATTORNEYS.

SUBDIVIDED MEAT MIXER AND METHOD

This application is a continuation-in-part of my copending application Ser. No. 689,066, filed Dec. 8, 1967, now U.S. Pat. No. 3,506,019.

The mixing apparatus and method of this invention provides very rapid and efficient mixing so that the invention is ideally suited for use in conjunction with a subsequent grinder that is selectively operable to grind the mixed meat into still smaller subdivisions.

One of the features of this invention therefore is to provide an apparatus for rapidly and thoroughly mixing subdivided meat especially prior to grinding to a still finer size.

A further feature of the invention is to provide a method of mixing which includes urging subdivided meat back and forth from one end of a mixing chamber toward another and back again preferably by using a plurality of spaced mixing paddles operating at different levels in the meat to insure rapid and uniform mixing.

Other features and advantages of the invention will be apparent from the following description of one embodiment of the invention taken in conjunction with the accompanying drawings. Of the drawings.

Figure 1:
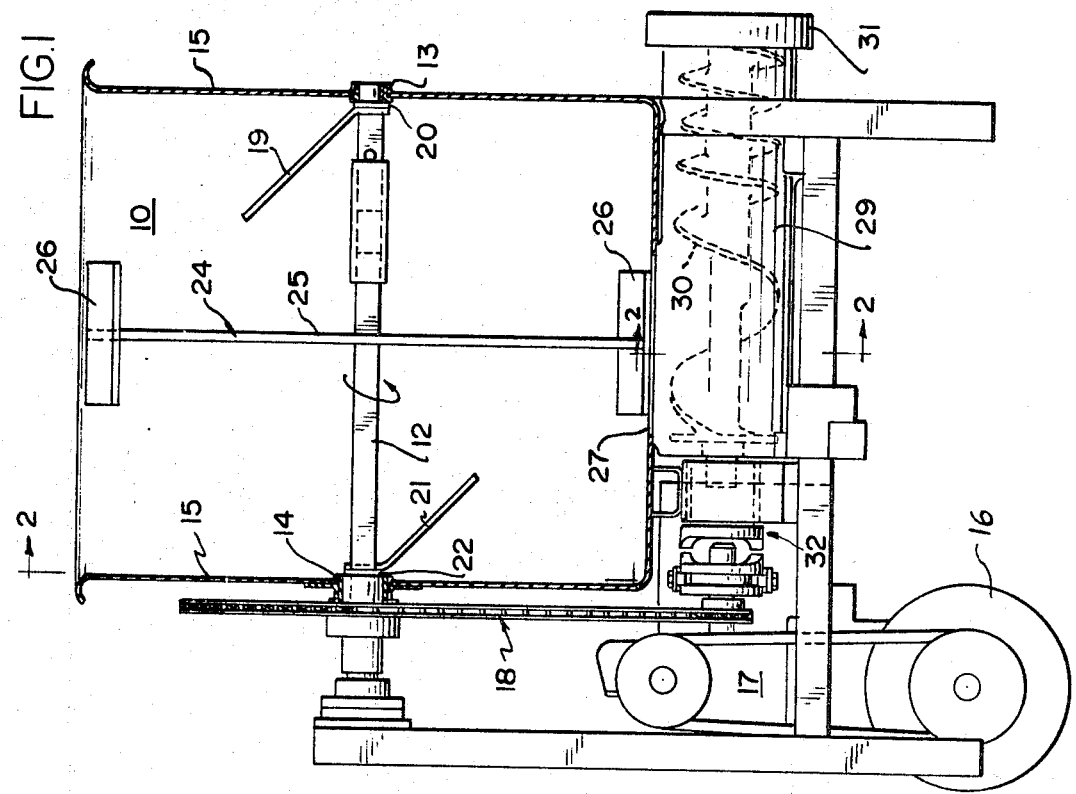
FIG. 1 is a side elevational view of a mixer-grinder embodying the invention with the mixing chamber or hopper in vertical section.
Figure 2:
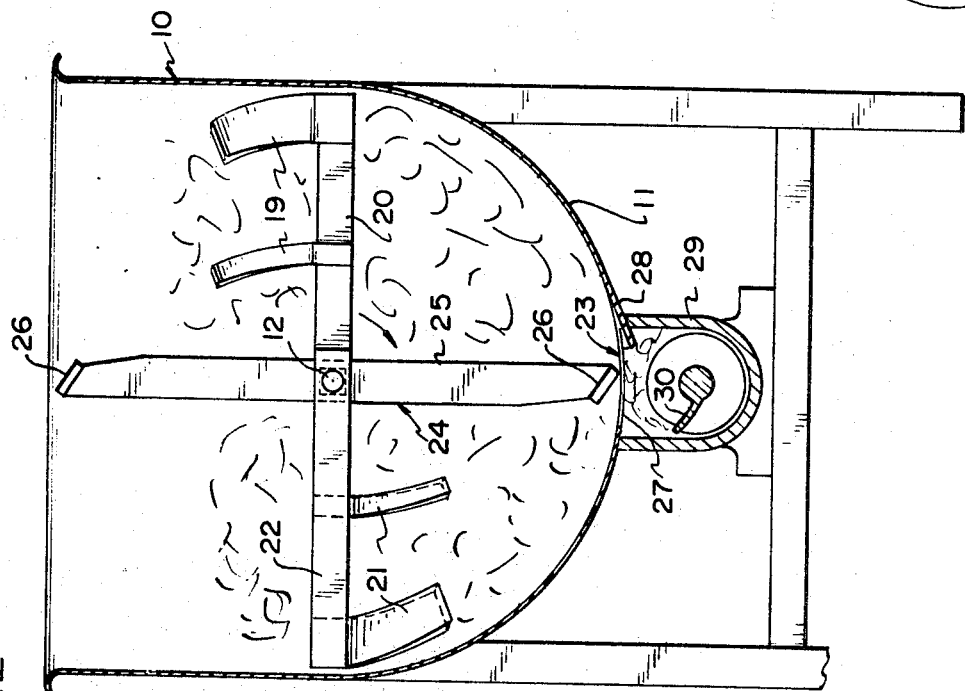
FIG. 2 is a vertical sectional elevational view taken substantially along line 2–2 of FIG. 1.
Figure 3:
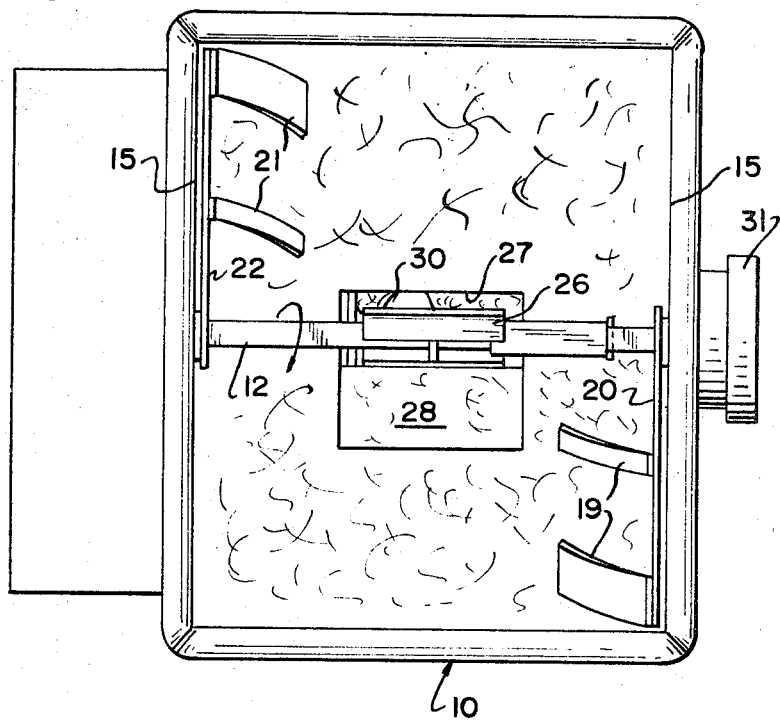
FIG. 3 is a plan view of the apparatus.

The mixer of this invention and the method of mixing provides for very rapid and thorough mixing of subdivided meat without toughening or otherwise damaging the meat. Because of this the mixer portion is ideally suited for mixing coarsely cut meat prior to subsequent grinding. In the preferred invention the grinder is incorporated into the structure of the mixing apparatus so that the mixed meat can be passed directly to the grinder.

In the present invention the mixing is achieved by folding or tumbling the meat and lifting the meat in an action that provides mixing but does not wipe a mixing paddle or agitator across the meat which tests have shown tends to toughen the meat in a very short time. In order to prevent this toughening wiping the mixing blades are narrow. Because of this mixing of the meat with the apparatus of this invention can be for an indefinite time such as as much as 15 minutes or more without toughening or degrading the meat. With prior mixers for meat of which the inventor is aware, toughening is so rapid that the mixing cannot be continued for more than ½ to 1 minute.

In the illustrated embodiment of the apparatus there is provided a mixing chamber 10 in the form of an open topped vat with an arcuately rounded bottom 11. At about the arcuate center of the chamber 10 there is provided a generally horizontal shaft 12 that is rotatably held in end bearings 13 and 14 in the sidewalls 15 of the chamber or vat 10.

The shaft 12 is adapted to be rotated by an electric motor 16 that drives a gear reducer 17 which in turn drives the shaft 12 by a conventional sprocket and chain arrangement 18.

Mounted on the shaft 12 so as to be rotated therewith is a first mixing blade 19 that is mounted on a support bar 20 attached to the shaft means 12. In the illustrated embodiment there is a plurality of first blades 19, here shown as two, spaced different distances from the center of rotation of the shaft means 12. Thus an outermost blade 19 when rotated moves adjacent the bottom or lower portion 11 of the chamber 10 while the second blade 19 moves in an annular path or zone between the outer blade 19 and the shaft 12.

Mounted on the other end of the shaft means 12 is a second mixing blade 21 that is preferably also arranged in a plural blade set, here shown as two second blades 21. These blades are spaced apart from each other similarly to the blades 19 so that one moves adjacent the lower portion 11 of the chamber 10 while the other blade 21 moves in a zone intermediate the outer blade and the shaft means 12. This pair of second blades 21 is mounted on a second support bar 22 also attached to the shaft means 12 and positioned adjacent the opposite sidewall 15. The set of first mixing blades 19 and the set of second mixing blades 21 are therefore laterally spaced from each other to adjacent the sidewalls 15 and are also angularly spaced from each other about the shaft means 12. Thus, in the illustrated embodiment the two pairs of blades are spaced 180° apart about the axis of rotation of the shaft means 12.

In order that the blades 19 and 21 in the two sets mix the subdivided meat and not wipe it which would cause immediate toughening by bringing out the meat fiber each blade is of narrow width. Thus, in the illustrated embodiment each outermost blade 19 and 21 is about 2 inches wide and each innermost blade is about 1 inch wide. In general, the width of the blades should be between about 0.5 and 3 inches.

In order to mix the meat rapidly and thoroughly each blade 19 and 21 is angled to the axis of the shaft means 12 rearwardly and toward the other set of blades with respect to its direction of movement. The result is that the mixing blades 19 and 21 which are preferably in sets of a plurality of blades spaced different distances from the axis of rotation move in spaced annular zones of movement through the meat. The result is that the moving blades 19 and 21 urge the meat alternately toward opposite zones during rotation of the shaft means.

Thus during this rotation the set of first blades 19 urge and propel the subdivided meat across the length of the mixing chamber 10 toward and into the zones of the second set of blades 21. Because of the angular spacing of the blades 19 and 21 the meat has time for a substantial portion thereof to reach the zones of the next blades before the blades contact the meat. Due to this passing back and forth of the meat from end to end which generally takes place at the top of the mixer, usually above the shaft, the mixing is rapid and very uniform. Mixing is uniform and rapid also because the blades tumble the meat and fold the meat over and over while drawing adjacent portions of meat into the folding. This mainly takes place in the bottom of the mixer and is preferably done in a plurality of layers such as the two illustrated.

Thus in the illustrative embodiments where 200 pounds of coarsely subdivided meat was mixed, the mixing was thorough and uniform in only 30 seconds.

In the bottom of the mixing chamber 10 there is located an exit opening means 23 between the zones of rotation of the mixing blades 19 and 21. In order to eject meat through this opening means there is provided an ejection blade means 24 mounted on the shaft means 12 at about the center thereof and rotatable with the shaft. This ejection means 24 comprises a centrally located support bar 25 that is rotatable with the shaft means 12 and that has opposite ends each provided with an ejection blade 26 arranged generally parallel to the axis of the shaft means 12 and positioned to be moved over but closely adjacent to the exit means 23. Each of the two blades 26 is angled forwardly with respect to its direction of movement so that as the blades pass over the exit opening 27 which forms a part of the exit means 23 it forces meat out and down through this opening. In order to aid the meat in passing through the opening and to break up lumps carried by the blades 26 the exit means 23 includes a downwardly sloped section 28 on the leading edge of the opening 27 or in the direction of approach of the blades 26. This causes large lumps carried by the blades to slide along the section and break up against the edge of the opening that is opposite the section 28.

Positioned beneath the opening 27 from the chamber 10 there is located a meat receiving grinding chamber 29 in which is located a meat moving screw 30 leading to a conventional grinding head 31. This screw 30 is adapted to be selectively driven by means of a clutch 32 of conventional construction.

In operation the subdivided meat is loaded into the mixing chamber 10 to any depth desired which can be above the level of the rotatable shaft means 12. The motor 16 is then energized to rotate the shaft means 12 and the mixing blades 19 and 21 mounted thereon. It of course rotates the blades 26 which also produce a mixing action. During this rotation the angled narrow mixing blades 19 and 21 urge the meat back and forth in the chamber 10, tumble and fold the meat as previously described so that very thorough mixing is accomplished in a very short time. Then, when the mixing is sufficiently complete so that grinding may be commenced the clutch 32 is used to drive the feed screw 30 which receives meat through the exit opening 27 under the urging of the ejection blades 26. The screw 30 which has a large pitch adjacent the exit opening 27 and a progressively smaller pitch toward the grinding head 31 rapidly forces the mixed meat through the grinding head 31. If a second grinding is desired this ground meat is then returned to the chamber 10 and this time mixing is continued simultaneously with the grinding if desired.

Another very important advantage of this invention is that the amount of meat that is mixed in a given mixer can vary widely. Thus with a mixer designed to handle about 200 pounds of meat with thorough mixing, and grinding where desired, amounts as small as 10 pounds can be mixed with equal efficiency.

Although the illustrated embodiment of the invention discloses a combined mixer-grinder it is obvious that the mixing portion of the apparatus can be utilized for fast and thorough mixing without subsequent grinding if such is desired.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Apparatus for mixing subdivided meat, comprising: a mixing chamber for the meat having a lower portion and an upper portion; a rotatable shaft means in said chamber; a first mixing blade rotatable with the shaft means movable in a first zone through the meat; and a second mixing blade rotatable with the shaft means laterally and angularly spaced from the first blade about the shaft means and movable in a second zone through the meat, each blade on said shaft means being angled toward the zone of the next blade with respect to its direction of movement with the result that the moving blades urge the meat alternately toward opposite said zones during rotation of said shaft means while tumbling and folding the meat, each said blade being long and narrow for mixing the meat during said rotation by movement through said lower portion of the chamber to tumble the meat and to fold the meat by clearing a path through the meat into which path adjacent portions of the meat fall, a part of the meat being lifted into said upper portion of the chamber by said inclined blades and urged away from the blades in said direction of said center.

2. The apparatus of claim 1 wherein there are provided a plurality of first blades spaced different distances from said shaft means and a plurality of second blades spaced different distances from said shaft means, with each blade rotatable in its said zone.

3. Apparatus for mixing subdivided meat, comprising: a mixing chamber for the meat having a lower portion and an upper portion; a rotatable shaft means in said chamber; a plurality of mixing blades spaced different distances from said shaft means, a first support support bar carried by said shaft means on which said first mixing blades are mounted; a plurality of second mixing blades spaced different distances from said shaft means laterally and angularly spaced from the first blades; and a second support bar carried by said shaft means on which said second mixing blades are mounted, each blade of each plurality of blades being movable in its zone through said meat and each of said plurality of first and second blades being angled toward the zone of the next plurality of blades with respect to the direction of movement of the blades with the result that the moving blades urge the meat alternately toward opposite said zones during rotation of said shaft means while tumbling and folding the meat.

4. The apparatus of claim 3 wherein said shaft means is generally horizontal, said chamber has opposite end walls between which said shaft means extends said first bar and first blades mounted thereon are located adjacent one said end wall and said second bar and second blades mounted thereon are located adjacent the opposite said end wall.

5. The apparatus of claim 3 wherein there are provided an exit opening means in said chamber lower portion between said zones of said plurality of blades for the exit of meat from the chamber, and an ejection blade means movable adjacent said opening for urging meat through the opening.

6. The apparatus of claim 5 wherein said ejection blade means is mounted on said shaft means for rotation therewith.

7. The apparatus of claim 5 wherein said exit opening means comprises a section of said lower portion sloped outwardly toward an exit opening.

8. The apparatus of claim 4 wherein there are provided an exit opening means in said chamber lower portion between said zones for the exit of meat from the chamber, and an ejection blade means movable adjacent said opening for urging meat through the opening, said exit opening means being about midway between said first bar and blades and said second bar and blades, said ejection blade means is mounted on said shaft means for rotation therewith and is angled toward said exit opening means to urge meat therethrough, and said exit opening means comprises a section of said lower portion sloped outwardly toward the exit opening.

9. The apparatus of claim 5 wherein there are provided power driven grinding means communicating with said exit opening means to receive meat therethrough, and power means for rotating said shaft means and selectively driving said grinding means.

10. The apparatus of claim 8 wherein there are provided power driven grinding means communicating with said exit opening means to receive meat therethrough, and power means for rotating said shaft means and selectively driving said grinding means.